United States Patent
Alexander et al.

(10) Patent No.: US 11,036,938 B2
(45) Date of Patent: Jun. 15, 2021

(54) MACHINE LEARNING SYSTEM FOR OPTIMIZING PROJECTS

(71) Applicant: ConceptDrop Inc., Chicago, IL (US)

(72) Inventors: Philip T. Alexander, Chicago, IL (US); Richard J. Hubbard, Chicago, IL (US); Frank Sung Chul Cho, Chicago, IL (US); Ruchir Doshi, Bartlett, IL (US)

(73) Assignee: ConceptDrop Inc., Chicago, IL (US)

( * ) Notice: Subject to any disclaimer, the term of this patent is extended or adjusted under 35 U.S.C. 154(b) by 96 days.

(21) Appl. No.: 16/165,329

(22) Filed: Oct. 19, 2018

(65) Prior Publication Data

US 2019/0121855 A1    Apr. 25, 2019

Related U.S. Application Data

(60) Provisional application No. 62/575,202, filed on Oct. 20, 2017.

(51) Int. Cl.
*G06F 40/30* (2020.01)
*G06F 16/9535* (2019.01)
(Continued)

(52) U.S. Cl.
CPC .......... *G06F 40/30* (2020.01); *G06F 16/243* (2019.01); *G06F 16/248* (2019.01);
(Continued)

(58) Field of Classification Search
CPC .... G06F 40/30; G06F 16/243; G06F 16/9535; G06F 16/24578; G06F 16/248; G06F 16/951; G06N 20/00; G06N 5/048
(Continued)

(56) References Cited

U.S. PATENT DOCUMENTS

| 6,058,395 A * | 5/2000 | Buzaglo .......... G06Q 10/10 |
| 6,212,549 B1 * | 4/2001 | Page ............... G06Q 10/06 709/205 |

(Continued)

FOREIGN PATENT DOCUMENTS

JP    2005157630 A  *  6/2005

OTHER PUBLICATIONS

Fitsilis et al., "Project Team Selection Based on Social Networks," 2014 IEEE International Technology Management Conference, IEEE, Jun. 2014, 4 pages. (Year: 2014).*

(Continued)

*Primary Examiner* — Phuong Thao Cao
(74) *Attorney, Agent, or Firm* — Akerman LLP; Mammen (Roy) P. Zachariah, Jr.

(57) ABSTRACT

A system for optimizing project and/or task completion through the use of machine learning is disclosed. The system receives attributes for a project and participants to participate in the project. The attributes are provided to a natural language processing engine to determine content related to the attributes. Once the content is determined, the system receives a selection of a portion of the content and attributes to be searched via a search engine of the system. The search engine may then determine potential combinations of participants, such as individuals, devices, programs, and/or robots, which are suited to participate in the project. A selected combination of participants may perform the project. Feedback relating to the project may be utilized to adjust search algorithm variable weights and parameters utilized by the search engine to optimize the relevance of potential combinations of participants generated in response to a future search for a future project.

20 Claims, 6 Drawing Sheets

(51) Int. Cl.
    *G06N 20/00*     (2019.01)
    *G06N 5/04*     (2006.01)
    *G06F 16/248*     (2019.01)
    *G06F 16/951*     (2019.01)
    *G06F 16/2457*     (2019.01)
    *G06F 16/242*     (2019.01)

(52) U.S. Cl.
    CPC ...... *G06F 16/24578* (2019.01); *G06F 16/951* (2019.01); *G06F 16/9535* (2019.01); *G06N 5/048* (2013.01); *G06N 20/00* (2019.01)

(58) Field of Classification Search
    USPC ............................................. 707/706
    See application file for complete search history.

(56) References Cited

U.S. PATENT DOCUMENTS

| | | | | | |
|---|---|---|---|---|---|
| 6,385,620 | B1* | 5/2002 | Kurzius | ............... | G06Q 10/10 |
| 7,003,475 | B1* | 2/2006 | Friedland | ............... | G06Q 10/06 |
| | | | | | 705/7.13 |
| 7,283,971 | B1* | 10/2007 | Levine | ............... | G06Q 10/06 |
| | | | | | 705/7.13 |
| 8,335,705 | B2* | 12/2012 | Ehrler | ............... | G06Q 10/063118 |
| | | | | | 705/7.15 |
| 8,838,585 | B2* | 9/2014 | Leslie | ............... | G06F 16/26 |
| | | | | | 707/723 |
| 9,002,869 | B2* | 4/2015 | Riezler | ............... | G06F 16/3338 |
| | | | | | 707/760 |
| 9,179,250 | B2* | 11/2015 | Eustice | ............... | H04W 4/029 |
| 9,189,756 | B2* | 11/2015 | Gilbert | ............... | G06F 16/164 |
| 9,684,698 | B1* | 6/2017 | Kannan | ............... | G06Q 10/101 |
| 10,338,892 | B2* | 7/2019 | Puri | ............... | G06F 8/30 |
| 10,592,806 | B1* | 3/2020 | Kannan | ............... | G06Q 10/063112 |
| 10,621,498 | B1* | 4/2020 | Tegtmeyer | ............... | G06N 5/048 |
| 2002/0073114 | A1* | 6/2002 | Nicastro | ............... | G06Q 10/10 |
| | | | | | 705/36 R |
| 2003/0216951 | A1* | 11/2003 | Ginis | ............... | G06Q 30/0201 |
| | | | | | 705/7.26 |
| 2004/0153472 | A1* | 8/2004 | Rieffanaugh, Jr. | ............... | G06Q 50/01 |
| 2005/0004825 | A1* | 1/2005 | Ehrler | ............... | G06Q 10/10 |
| | | | | | 705/7.17 |
| 2007/0118433 | A1* | 5/2007 | Bess | ............... | G06Q 30/0611 |
| | | | | | 705/7.13 |
| 2007/0198319 | A1* | 8/2007 | Sciuk | ............... | G06Q 10/063112 |
| | | | | | 705/7.26 |
| 2007/0288480 | A1* | 12/2007 | Caplan | ............... | G06F 16/9537 |
| 2008/0183538 | A1* | 7/2008 | Hamadi | ............... | G06Q 10/063112 |
| | | | | | 705/7.14 |
| 2008/0208914 | A1* | 8/2008 | Navani | ............... | G16H 50/70 |
| 2008/0209431 | A1* | 8/2008 | La Vecchia | ............... | G06Q 10/00 |
| | | | | | 718/104 |
| 2008/0215541 | A1* | 9/2008 | Li | ............... | G06F 16/951 |
| 2008/0228741 | A1* | 9/2008 | Redfern | ............... | G06F 16/3323 |
| 2008/0243581 | A1* | 10/2008 | Jennings | ............... | G06Q 10/06 |
| | | | | | 705/7.12 |
| 2008/0319962 | A1* | 12/2008 | Riezler | ............... | G06F 16/3338 |
| 2009/0187458 | A1* | 7/2009 | Agrawal | ............... | G06Q 10/063118 |
| | | | | | 705/7.17 |
| 2009/0234686 | A1* | 9/2009 | Chakra | ............... | G06Q 10/06 |
| | | | | | 705/325 |
| 2009/0300577 | A1* | 12/2009 | Bernardini | ............... | G06F 8/70 |
| | | | | | 717/101 |
| 2010/0017382 | A1* | 1/2010 | Katragadda | ............... | G06F 16/951 |
| | | | | | 706/12 |
| 2010/0088139 | A1* | 4/2010 | Rahi | ............... | G06Q 10/0637 |
| | | | | | 705/7.36 |
| 2010/0153290 | A1* | 6/2010 | Duggan | ............... | G06Q 10/1053 |
| | | | | | 705/321 |
| 2011/0197061 | A1* | 8/2011 | Chou | ............... | H04L 9/006 |
| | | | | | 713/156 |
| 2011/0213211 | A1* | 9/2011 | Stevens | ............... | G06Q 10/00 |
| | | | | | 600/300 |
| 2011/0302582 | A1* | 12/2011 | Jacobson | ............... | G06F 9/5094 |
| | | | | | 718/102 |
| 2012/0110087 | A1* | 5/2012 | Culver | ............... | G06Q 10/067 |
| | | | | | 709/205 |
| 2012/0310954 | A1* | 12/2012 | Gaikwad | ............... | G06F 16/3323 |
| | | | | | 707/754 |
| 2013/0073533 | A1* | 3/2013 | Hickey | ............... | G06N 20/00 |
| | | | | | 707/706 |
| 2013/0159306 | A1* | 6/2013 | Janssen, Jr. | ............... | G06F 16/3338 |
| | | | | | 707/737 |
| 2013/0191291 | A1* | 7/2013 | Greeson | ............... | G06Q 10/103 |
| | | | | | 705/301 |
| 2013/0339969 | A1* | 12/2013 | Koski | ............... | G06Q 10/10 |
| | | | | | 718/103 |
| 2014/0024462 | A1* | 1/2014 | Qiang | ............... | A63F 13/847 |
| | | | | | 463/42 |
| 2014/0122144 | A1* | 5/2014 | Cirpus | ............... | G06Q 10/06 |
| | | | | | 705/7.14 |
| 2014/0195536 | A1* | 7/2014 | Diament | ............... | G06F 16/35 |
| | | | | | 707/737 |
| 2014/0282355 | A1* | 9/2014 | Berry | ............... | G06F 8/70 |
| | | | | | 717/101 |
| 2014/0298409 | A1* | 10/2014 | Mock | ............... | G06F 21/60 |
| | | | | | 726/1 |
| 2014/0358607 | A1* | 12/2014 | Gupta | ............... | G06Q 10/063112 |
| | | | | | 705/7.14 |
| 2015/0066780 | A1* | 3/2015 | Cohen | ............... | G06Q 10/101 |
| | | | | | 705/300 |
| 2015/0088567 | A1* | 3/2015 | Lambroschini | ............... | G06Q 10/063118 |
| | | | | | 705/7.14 |
| 2015/0095370 | A1* | 4/2015 | Davidson | ............... | H04L 67/30 |
| | | | | | 707/769 |
| 2015/0100501 | A1* | 4/2015 | Young | ............... | G06Q 10/101 |
| | | | | | 705/300 |
| 2015/0112983 | A1* | 4/2015 | Srivastava | ............... | G06Q 10/10 |
| | | | | | 707/732 |
| 2015/0153906 | A1* | 6/2015 | Liao | ............... | G06F 16/78 |
| | | | | | 715/709 |
| 2015/0169557 | A1* | 6/2015 | Ciordas | ............... | H04N 21/4826 |
| | | | | | 707/609 |
| 2015/0310115 | A1* | 10/2015 | Ryger | ............... | G06F 16/9535 |
| | | | | | 707/708 |
| 2015/0317579 | A1* | 11/2015 | Summers | ............... | G06Q 10/04 |
| | | | | | 705/7.37 |
| 2015/0365902 | A1* | 12/2015 | Ur | ............... | H04W 4/30 |
| | | | | | 455/418 |
| 2015/0371168 | A1* | 12/2015 | Karabin | ............... | G06Q 10/06313 |
| | | | | | 705/7.23 |
| 2015/0379447 | A1* | 12/2015 | Katkar | ............... | G06Q 10/06313 |
| | | | | | 705/7.17 |
| 2016/0055446 | A1* | 2/2016 | Sen | ............... | G06Q 10/063118 |
| | | | | | 705/7.17 |
| 2016/0147878 | A1* | 5/2016 | Mana | ............... | G06F 16/3344 |
| | | | | | 707/706 |
| 2016/0226854 | A1* | 8/2016 | Chen | ............... | G06Q 10/101 |
| 2016/0275434 | A1* | 9/2016 | Briganti | ............... | G06Q 10/063118 |
| 2016/0342636 | A1* | 11/2016 | Braghin | ............... | G06F 9/5055 |
| 2017/0185397 | A1* | 6/2017 | Sakaki | ............... | G06F 8/77 |
| 2017/0249574 | A1* | 8/2017 | Knijnik | ............... | G06Q 10/06314 |
| 2017/0262783 | A1* | 9/2017 | Franceschini | ............... | G06N 5/04 |
| 2017/0270443 | A1* | 9/2017 | Melo | ............... | G06Q 10/063118 |
| 2018/0060788 | A1* | 3/2018 | Mase | ............... | G06F 16/25 |
| 2018/0130019 | A1* | 5/2018 | Kolb | ............... | G06Q 10/10 |
| 2018/0157641 | A1* | 6/2018 | Byron | ............... | G06N 20/00 |
| 2018/0174250 | A1* | 6/2018 | Faulkner | ............... | G06F 3/04842 |
| 2018/0189735 | A1* | 7/2018 | Lo | ............... | G06Q 10/103 |
| 2018/0246972 | A1* | 8/2018 | Shukla | ............... | G06F 16/9535 |
| 2019/0050494 | A1* | 2/2019 | Rao | ............... | G06F 16/7867 |
| 2019/0286663 | A1* | 9/2019 | Liu | ............... | G06F 16/9035 |

OTHER PUBLICATIONS

IBM Technical Disclosure Bulletin, "Information of Partnerships of Small Contractors Through the Internet," Jul. 2000, 2 pages. (Year: 2000).*

(56) References Cited

OTHER PUBLICATIONS

Zhu et al., "Motivations for Self-Assembling into Project Teams," Social Networks, vol. 35, Issue 2, May 2013, pp. 251-264. (Year: 2013).*

Workday, Inc., "Human Resource Management," accessed 2017, document of 3 pages. https://www.workday.com/en-au/applications/human-capital-management/human-resource-management.html.

Oracle Corp., "Oracle People Soft—Human Capital Management," accessed 2017, document of 4 pages. http://www.oracle.com/us/products/applications/peoplesoft-enterprise/human-capital-management/overview/index.html.

Oracle Corp., "Oracle Taleo Recruiting Cloud Service," accessed 2017, document of 2 pages. http://www.oracle.com/us/products/applications/taleo/enterprise/recruiting/features/index.html.

SAP SuccessFactor, "SAP SuccessFactor—Welcome to the human revolution," accessed 2017, document of 6 pages. https://www.successfactors.com/en_us.html.

ADP, LLC, "HR Services," accessed 2017, document of 2 pages. https://www.adp.com/solutions/services/human-capital-management.aspx.

IBM, "IBM Watson Talent Insights," accessed 2017, document of 2 pages. https://www.ibm.com/us-en/marketplace/workforce-analytics.

* cited by examiner ized contributors and the like as well, and it also may also be and methods may suggest other changes, modifications, etc., based on the feedback provided by the participants.

MACHINE LEARNING SYSTEM FOR OPTIMIZING PROJECTS

CROSS REFERENCE TO RELATED APPLICATIONS AND PRIORITY

The present application claims priority to and the benefit of U.S. Provisional Patent Application No. 62/575,202, filed Oct. 20, 2017, the entirety of which is hereby incorporated by reference.

FIELD OF THE INVENTION

The present application relates to machine learning technologies, natural language processing technologies, data aggregation, manipulation, and analysis technologies, database technologies, search engine technologies, project optimization technologies, artificial intelligence technologies, and computing technologies, and more particularly, to a machine learning system for optimizing the completion of projects, tasks, or a combination thereof.

BACKGROUND

In today's technologically-driven society, various systems and methods exist for assisting users in finding appropriate participants for completing a project or task. For example, a particular business may have an online website that may be made accessible to potential participants so that the participants may inquire about a project of the business, submit a request to participate in the project, view parameters and requirements of the project, and inquire about any incentives or compensation associated with participating in the project. Additionally, there are various systems and methods that provide human resource management, which focus on broad-level workforce demographics when attempting to pair participants with a particular project. When pairing participants with a particular project, current systems and methods typically operate with the underlying assumption that if a selected team of participants has the rights skills and experience, includes participants that are personally likeable, and includes participants that have the right personality fit, the selected team should perform well on the project. Notably, however, the actual performance of a team of participants that is selected based on this underlying assumption often does not translate into or correspond with the level of performance desired by those in control of the project.

Even though various systems and methods exist for locating potential participants for a particular project, such systems and methods are often difficult for users to navigate and do not provide enough relevant information to a user to make an effective decision as to whether or not a particular participant should be selected for the project. Additionally, current technologies and processes are often error-prone, provide a lot of irrelevant information, only use data that corresponds to a snapshot in time, require the accessing of data scattered across multiple and disparate data sources, and may be difficult to implement. Moreover, while current technologies have been utilized to pair participants with projects, currently existing technologies have not provided optimal ways of doing so and do not effectively utilize computing resources. As a result, current technologies and processes may be modified and improved so as to provide enhanced functionality and features for users and systems to determine the optimal combinations of participants for a project and/or task in an expeditious and effective manner.

Such enhancements and improvements may provide for improved project completion rates, higher quality project completion outcomes, improved user satisfaction, increased efficiencies, increased access to meaningful data, substantially-improved decision-making abilities, and increased ease-of-use for users, while simultaneously optimizing the use of computing resources.

SUMMARY

A system and methods for optimizing project and/or task completion through the use of machine learning are disclosed. In particular, the system and accompanying methods provide for a robust application and technological environment, which utilizes algorithms and various inputs to determine potential combinations of participants for the project and/or for tasks within the project. The participants, for example, may include, but are not limited to, individuals, devices (e.g. computing devices), computer software, robots, any other type of participant, or any combination thereof. Also, the system and accompanying methods provide a novel way for searching for participants to participate in the projects and/or tasks. To that end, the system and methods may utilize a website, an application, or other software program that address challenges relating to workforce optimization and project completion optimization. The system and methods may provide the ability to predict successful team composition based on organizational behavioral science, and may provide a feedback mechanism that updates participant skills, experiences, and behavior to improve the ability to predict team success. Moreover, the system and methods utilize modern data analytics and machine learning to assist in the creation of more optimal team combinations of participants and maintain up-to-date data relating to the participants.

Notably, the system and method provide a cloud-based platform that allows user and/or devices to search and locate resources, build teams, and collect performance data during and/or after the completion of projects. A profile is developed for each potential participant that includes a defined list of attributes, which, for example, may include geography, language skills, certifications, soft skills, hourly rates, typical availability for the participant, etc. associated with a participant. Once the profiles are completed, a search algorithm utilized by the system and method is able to index all of this information and, on a real-time query basis, identify participants for a project that fulfill criteria and requirements for the project. The search algorithm may be configured to also predict which potential participants will be more successful in certain team combinations than other potential participants. Once a particular combination of participants is selected to perform the task, the system and methods may include prompting the participants to provide critical feedback, based on multiple elements, which may then be utilized to update each participant's profile. The search algorithm may index the updated information for future queries either for an identical project, a similar project, or another project.

The functionality provided by the system and method effectively address current difficulties with tapping into various information silos that hold numerous participant attributes, such as information that describes everything about a participant ranging from demographic data, geographic data, skills, experiences, performance review data, and the like. In existing systems, this information is often scattered across different technology platforms, sometimes captured in paper-based systems, and other times not documented at all anywhere.

Additionally, in existing systems, this information is often not updated on a regular basis or at all. Furthermore, as organizations get larger, it becomes harder for an individual to utilize their own personal network to find the right participant with the skill sets and experiences to staff a particular project or role within a project. Still further, the system and methods optimize how to determine which participant combinations result in the highest performance on a project.

To that end, in one embodiment according to the present disclosure, a machine learning system for optimizing project and/or task completion is disclosed. The system may include a memory that stores instructions and a processor that executes the instructions to perform operations conducted by the system. The system may perform an operation that includes receiving, from a first computing device and at a graphical user interface search element of an application, first attributes associated with a project and second attributes for individuals and/or devices to participate in tasks associated with completing the project. The system may then perform an operation that includes providing, to a controller of a natural language engine, the first attributes and the second attributes received by the system. Once the first and second attributes are provided to the controller of the natural language engine, the controller may provide the first attributes and the second attributes to a semantic query library, to a machine learning module, and/or to a natural language processing algorithm to determine content related to the first attributes and the second attributes. For example, the content may be keywords, text, images, video content, augmented reality content, virtual reality content, identifiers, any type of content, or any combination thereof, which is related to the first attributes and/or the second attributes. Once the content is determined, the content may be received at the controller of the system, and the controller may provide the content to the application, such as at the graphical user interface search element or to another desired location. The system may then perform an operation that includes receiving, via the graphical user interface search element, a selection of a portion of the content to be searched via a search engine. The system may proceed to execute, by utilizing the search engine, a search based on the selection of the portion of the content, the first attributes, and/or the second attributes. Based on the search, the system may determine potential combinations of individuals, devices, programs, or a combination thereof, for participating in the project. The system may determine the potential combinations based on the individuals, devices, programs, or a combination thereof, having a correlation with the first attributes associated with the project, the second attributes, the portion of the content, or a combination thereof. As a result, the system can provide optimal combinations of participants, which may be utilized to complete the entire project itself and/or tasks within the project.

In another embodiment, a method for optimizing project and/or task completion through the use of machine learning is disclosed. The method may include utilizing a memory that stores instructions, and a processor that executes the instructions to perform the various functions of the method. In particular, the method may include receiving, from a first computing device and at a graphical user interface search element, first attributes associated with a project and second attributes for individuals, devices, or a combination thereof, to participate in tasks associated with completing the project. Additionally, the method may include providing, to a controller of a natural language engine, the first attributes and the second attributes. The method may also include providing, via the controller of the natural language engine, the first attributes and the second attributes to a semantic query library, to a machine learning module, and to a natural language processing algorithm to determine content related to the first attributes and the second attributes. Once the content is determined, the method may include receiving the content at the controller, and providing the content to the graphical user interface search element of the application. The method may proceed to include receiving, via the graphical user interface search element, a selection of a portion of the content to be searched via a search engine. Furthermore, the method may include executing, by utilizing the search engine, a search based on the selection of the portion of the content, the first attributes, and the second attributes. Moreover, the method may include determining, based on the search, potential combinations of individuals, devices, or a combination thereof, for participating in the project. Notably, the potential combinations may be determined based on the individuals, the devices, or a combination thereof, in the potential combinations having a correlation with the first attributes, the second attributes, the portion of the content, or a combination thereof.

According to yet another embodiment, a computer-readable device having instructions for optimizing project and/or task completion through the use of machine learning is provided. The computer instructions, which when loaded and executed by a processor, may cause the processor to perform operations including: receiving, from a first computing device and at a graphical user interface search element, first attributes associated with a project and second attributes for individuals, devices, or a combination thereof, to participate in tasks associated with completing the project; providing, to a controller of a natural language engine, the first attributes and the second attributes; providing, via the controller of the natural language engine, the first attributes and the second attributes to a semantic query library and to a natural language processing algorithm to determine content related to the first attributes and the second attributes; receiving the content at the controller; providing the content to the graphical user interface search element; receiving, via the graphical user interface search element, a selection of a portion of the content to be searched via a search engine; executing, by utilizing the search engine, a search based on the selection of the portion of the content, the first attributes, and the second attributes; and determining, based on the search, potential combinations of individuals, devices, or a combination thereof, for participating in the project, wherein the potential combinations are determined based on the individuals, the devices, or a combination thereof, in the potential combinations having a correlation with the first attributes, the second attributes, the portion of the content, or a combination thereof.

These and other features of the systems and methods for optimizing project and/or task completion through the use of machine learning are described in the following detailed description, drawings, and appended claims.

DETAILED DESCRIPTION OF THE INVENTION

Figure 1:
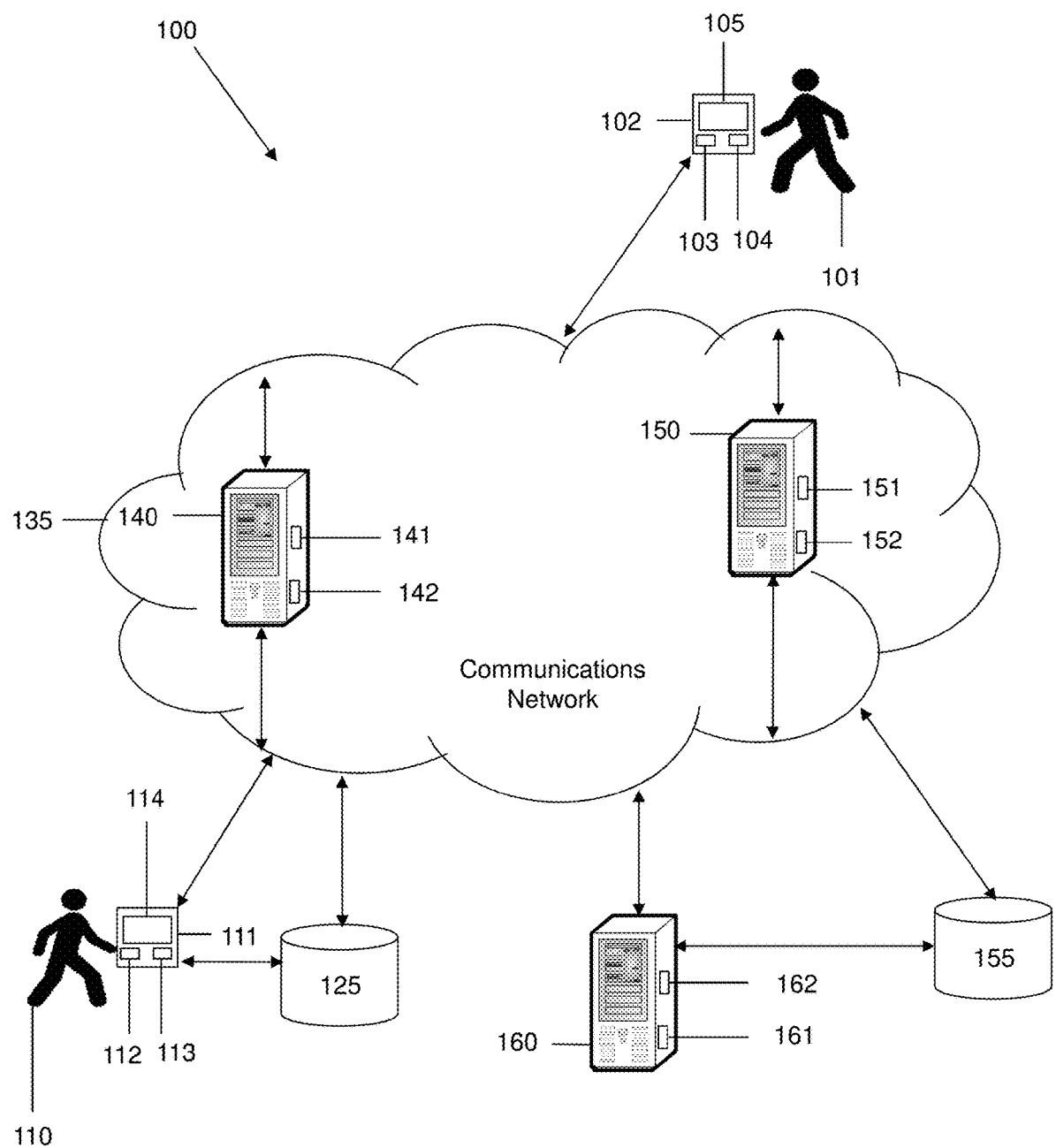
FIG. 1 is a schematic diagram of a system for optimizing project and/or task completion through the use of machine learning according to an embodiment of the present disclosure.

A system 100 and methods for optimizing project and/or task completion through the use of machine learning are disclosed. In particular, the system 100 and accompanying methods provide for a robust application and technological environment, which utilizes algorithms and various inputs to determine potential combinations of participants for participating in the project and/or for participating in tasks within the project. The participants, for example, may include, but are not limited to, individuals, devices, computer software programs, robots, any other type of participant, or a combination thereof. Additionally, the system 100 and accompanying methods provide a novel way for searching for participants to participate in the projects and/or tasks. To that end, the system 100 and methods may utilize a software as a service platform, a website, an application, or other software program that allows for the importation of multiple data elements into a search engine, thereby allowing a user or system to find, in rapid fashion, the optimal participants to perform a project. Notably, the search engine 220 of the system 100 determines and locates participants for a project that have attributes most closely associated in a content taxonomy list (e.g. a word taxonomy list) as defined by a company or other entity controlling the project. This search engine 220 also incorporates organization behavioral science to predict which potential combinations of participants will produce higher performing teams for the project.

The word taxonomy utilized by the system 100 and methods may be built through natural language processing techniques. By utilizing the natural language processing techniques, a user or device is able to perform a high level keyword search, and the search engine 220 will produce results with potential team combinations including participants that have skills not necessarily identified in the keyword search, but are nonetheless related to the keywords in the search. The natural language processing techniques utilized herein produce word and term associations that are effectively utilized to determine optimal combinations of participants for projects. Notably, as the system 100 operates, the word taxonomy may be updated through machine language techniques to improve natural language processing performance by utilizing growing datasets to understand which words are more likely to be associated with other words, content, and/or terms. The system 100 and methods may also utilize deep neural network learning to fine tune organizational behavioral science algorithms to determine which participants would fit better in certain combinations to produce higher team performance.

The system 100 and methods accomplish several goals. To that end, the system 100 and methods provide for the indexing of various participant attribute data scattered across multiple data sources to be used in a dynamic, real-time search algorithm, thereby allowing a user or device to find particular combinations of participants who best fit search criteria for various defined attributes. Such attributes may be readily provided in a master list by a user or device controlling the project. As attributes are updated and created over time, natural language algorithms build upon the word taxonomy that defines how various participant attributes are related to each other. At the early stages of deployment of the system, simple machine learning algorithms may be utilized to improve the best fit word taxonomy (content taxonomy) created by the natural language algorithms utilized by the system 100. However, as larger and larger data sets are created, the system 100 may utilized deep neural network learning algorithms to better understand which words (or content) better fit with other words (or content) to produce a more optimal search result.

The system 100 and methods also effectively obtain feedback from participants or others associated with the project and provide the feedback to the system's 100 machine learning and/or deep neural network learning organizational behavioral algorithms. The feedback process builds a growing set of organizational behavioral data, which is utilized in conjunction with pre-existing data sets to predict a work team's ability to succeed on a given project. As each employee goes through each feedback loop on each engagement, a profile of each participant and team interaction characteristics is generated. The machine learning and/or deep neural network learning organizational behavioral algorithms begin to determine which participant attributes are more important for team performance for a project. Finally, the system 100 and methods augment and expand the participant pool with a vetted contingent workforce of participants.

As shown in FIGS. 1-6, a system 100 for optimizing project and/or task completion through the use of machine learning is disclosed. The system 100 may be configured to support, but is not limited to supporting, data and content services, computing applications and services, cloud computing services, internet services, satellite services, telephone services, software as a service (SaaS) applications, mobile applications and services, and any other computing applications and services. The system may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may potentially be selected and utilized for participating in a project, such as by second user 110 or by second user device 111. For example, the first user 101 may be an individual that is seeking a project that corresponds with his or her skill set, aspirations, career objectives, learning objectives, or a combination thereof. The projects may be any type of project including, but not limited to, computer-based projects (e.g. software development or hardware development), job-based projects, financial projects, legal projects, architectural projects, culinary projects, engineering projects, content creation projects, any type of project, or any combination thereof.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. The second user 110 may be an individual that has control of the project and is seeking participants to participate in the project. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include applications for facilitating the completion of tasks and/or projects, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for determining participants for participating in projects, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140, and 150 may be utilized to perform the various operations and functions provided by the system 100, such as those requested by applications executing on the first and second user devices 102, 111. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 125 of the system 100 may be utilized to store and relay information that is associated with a project, the tasks within a project, information that traverses the system 100, information associated with possible participants for a project, requirements and parameters for a project, keywords and identifiers associated with a project, any other information generated by the system 100, or a combination thereof. The database 125 may also be utilized to store user profiles and/or device profiles for the possible participants. The user profiles may include any type of information associated with a participant, such as, but not limited to, skill set information, resume information, contact information, demographic information, psychographic information, work history information, education information, project preference information (e.g. what types of projects a particular user is willing to participate in), any attributes of a user, any other information, or a combination thereof. Device profiles may include any type of information associated with a device, such as, but not limited to, operating system information, hardware specifications, information about each component of the device (e.g. sensors, processors, memories, batteries, etc.), attributes of the device, any other information, or a combination thereof. In certain embodiments, the database 125 may be connected to the communications network 135, any other network, or a combination thereof. In certain embodiments, the database 125 may serve as a central repository for any information associated with a project, the second user 110, a business associated with a project or the second user 110, or a combination thereof. Furthermore, the database 125 may include a processor and memory or be connected to a processor and memory to perform the various operations associated with the database 125. In certain embodiments, the database 125 may be connected to the servers 140, 150, 160, the first user device 102, the second user device 111, any devices in the system 100, any other device, any network, or any combination thereof. In certain embodiments, database 125 may correspond with database 226, which may be a company database of the system 100. The database 226 may include one or more profiles for individuals, devices, robots, programs, any type of potential participant, or any combination thereof. In certain embodiments, the database 226 may be controlled by the second user 110, the second user device 111, an entity associated with the second user 110 and/or the second user device 111, or a combination thereof. Access to the database 226 may be granted to the system 100 and information stored in the database 226 may be transferred to the system 100.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the natural language machine learning module 218, operations performed and output generated by the search engine machine learning module 230, or any combination thereof. For example, the database 155 may store potential combinations of individuals and devices that are determined by the system 100 to be suitable for a particular project. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The database 155 may store algorithms for determining optimal participants to be utilized in a project, algorithm variable weights and parameters, algorithms that utilize feedback provided by the first and second users 101, 110 to optimize the combinations of participants determined by the system 100, any other algorithms for performing any other calculations in the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100. In certain embodiments, database 155 may correspond with database 224, which may be a marketplace database of the system 100. In certain embodiments, the marketplace database may be a database that includes profiles for contingent workers (e.g. freelancers) that may be utilized to work on a project. The database 224 may also include device profiles and user profiles for potential participants that the system 100 has direct access to.

The system 100 may also include a software application, which may be configured to perform and support the operative functions of the system 100. In certain embodiments, the application may be a website, a mobile application, a software application, or a combination thereof, which may be made accessible to users utilizing one or more computing devices, such as first user device 102 and second user device 111. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom graphical user interface that the first user 101 or second user 110 may interact with by utilizing a web browser executing on the first user device 102 or second user device 111. In certain embodiments, the software application may execute directly as an installed program on the first and/or second user devices 102, 111.

Figure 2:
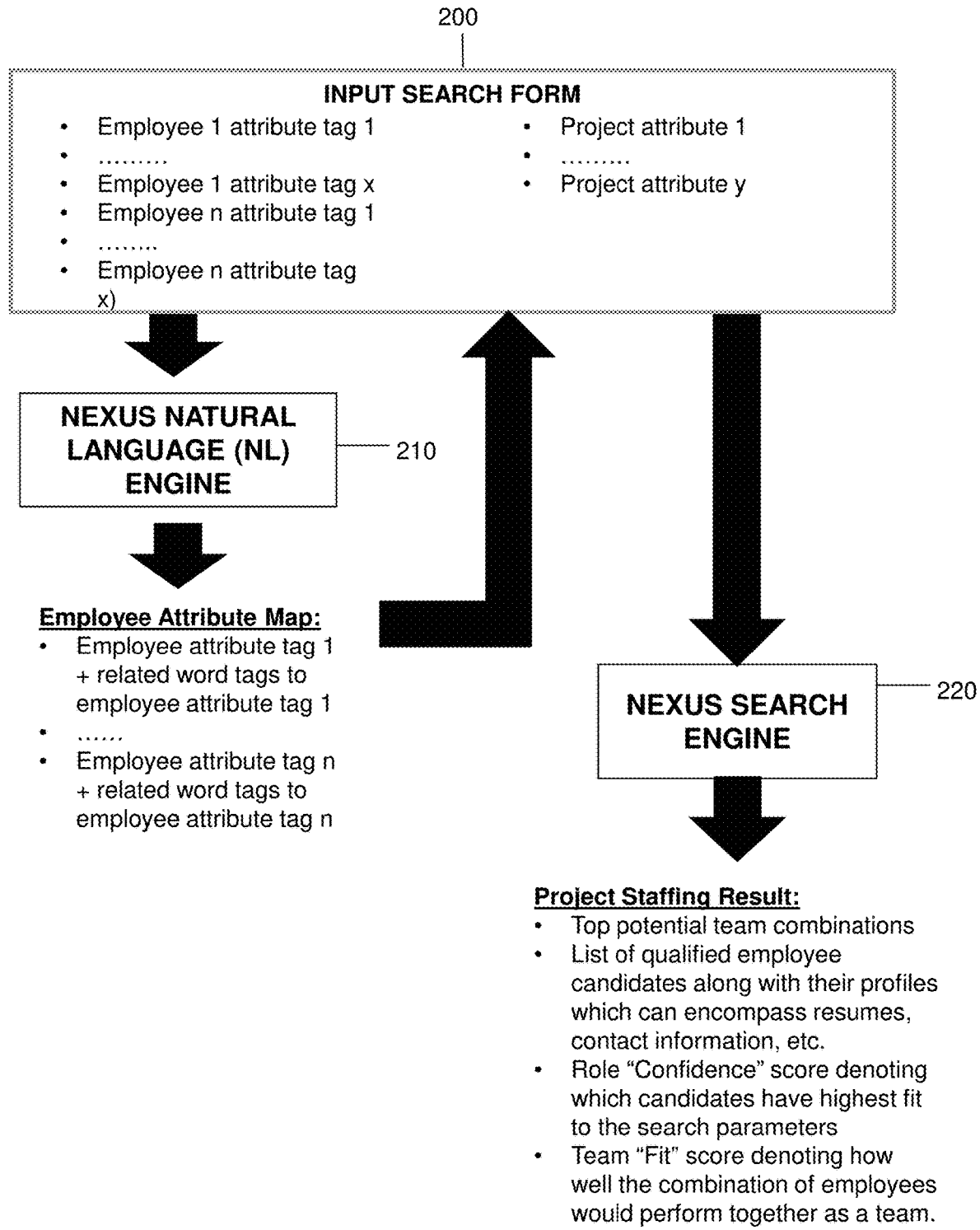
FIG. 2 is a diagram illustrating various features and components of the system of FIG. 1 including an input search element for inputting attributes, a natural language engine for generating an attribute map including content related to the attributes, and a search engine for providing potential combinations of participants based on the attributes.
Figure 3:
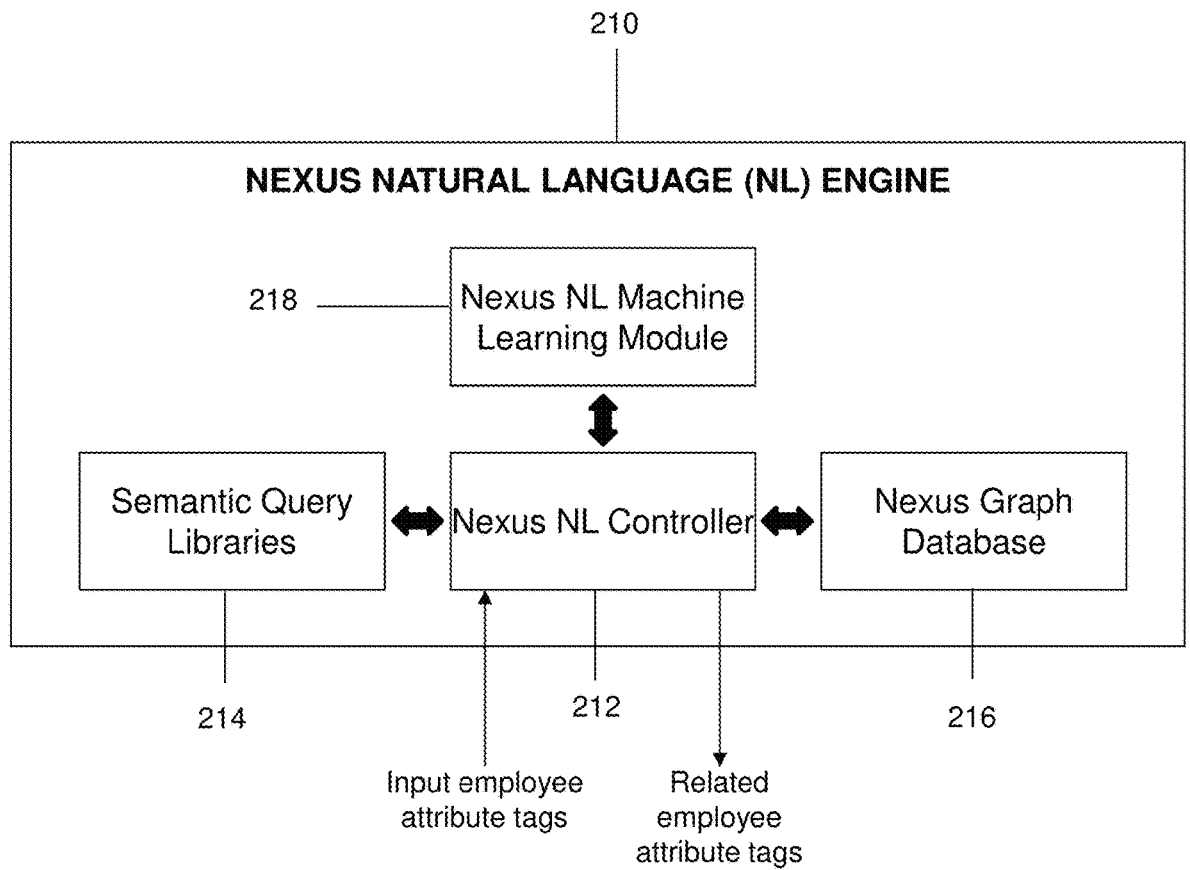
FIG. 3 is a diagram illustrating components and functionality of a natural language engine utilized in the system of FIG. 1.
Figure 4:
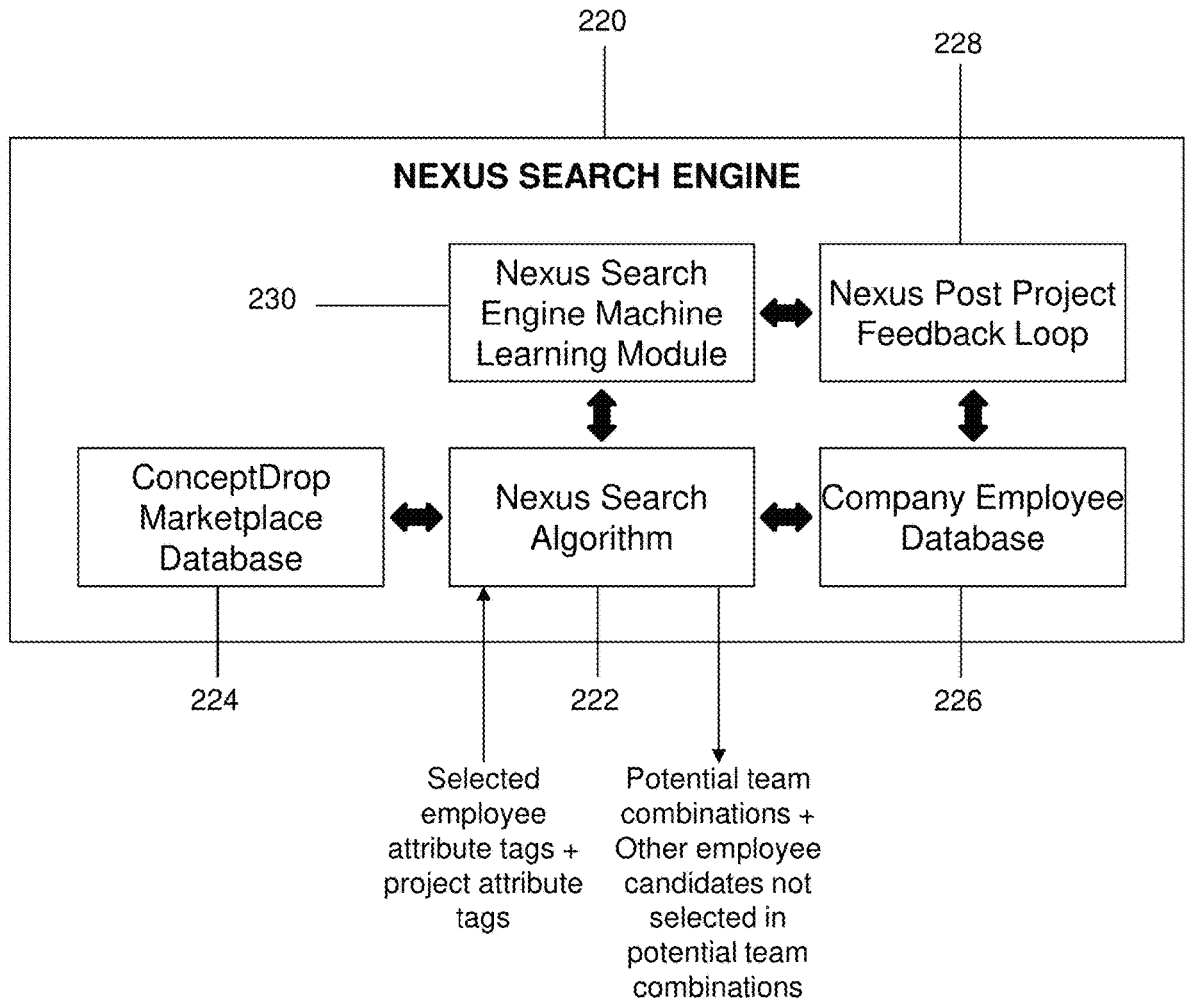
FIG. 4 is a diagram illustrating components and functionality of a search engine utilized in the system of FIG. 1.

Referring to FIG. 2-4, the software application may include multiple programs and/or functions that execute within the software application and/or are accessible by the software application. For example, the software application may include an application that generates web content and pages that may be accessible to the first and/or second user devices 102, 111, a natural language engine 210, a search engine 220, any type of program, or any combination thereof. The application that generates web content and pages may be configured to generate a graphical user interface for the software application that is accessible and viewable by the first and second users 101, 110 when the software application is loaded and executed on the first and/or second computing devices 102, 111. The graphical user interface for the software application may display content associated with a project, tasks to be completed within the project, a search element 200 (e.g. a graphical user interface search element), web forms and input boxes, any type of input functionality, or any combination thereof. Additionally, the graphical user interface may display functionality provided by the software application that enables the second user 110 and/or the second computing device 111 to input parameters and requirements for a project and/or tasks within the project. The functionality may also allow parameters and requirements for participants for the project to be inputted as well into the system 100.

The search element 200 of the software application may enable the second user 110 and/or the second computing device 111 to input first attributes associated with a project and second attributes required and/or desired for participants to participate in the project. In certain embodiments, the first attributes for the project may include, but are not limited to, information describing requirements for the project, information describing objectives for the project, information describing tasks to be completed within the project, information describing the type of project, information describing a desired end result of the project, any attribute associated with the project, or any combination thereof. The second attributes may describe attributes required and/or desired for any type of participant. For example, for human participants, the second attributes may include, but are not limited to, information describing skill sets desired for individuals to participate in the project, information describing demographic information required for individuals to participate in the project (e.g. age, location, education level, gender, ethnicity, race, health status, etc.), language skills desired for individuals to participate in the project, certifications required for an individual to participate in the project, incentives and/or compensation to be provided to an individual for participating in the project, required availability and duration for a participant to participate in the project, any other attributes, or any combination thereof. For device and/or software program participants, the second attributes may include, but are not limited to, memory requirements for participating in the project, processing power requirements for participating in the project, power levels (e.g. battery levels, charge levels, etc.) for participating in the project, an ability to execute selected algorithms for accomplishing tasks of the project, sensor requirements for participating in the project, operating system requirements, telecommunication capabilities necessary for participating in the project, any device specifications for a device to participate in the project, functional requirements necessary for participating in the project, any other attribute, or any combination thereof. For robot participants, the second attributes may include, but are not limited to, required appendages for the robot, processing power requirements, minimum and/or maximum weight requirements, minimum weight-carrying requirements, sensor requirements, telecommunication capabilities, required modes of transportation, memory requirements, operating system requirements, required programs installed on or capable of executing on the robot, any other requirements associated with robotics, or any combination thereof. In certain embodiments, the first attributes for the project and/or the second attributes for the participants to participate in the project may be represented by keywords, identifiers, tags, words, images, video content, media content, audio content, or any combination thereof. In certain embodiments, the first and second attributes may be stored in user profiles and device profiles corresponding to possible participants.

The search element 200 may also be the location in the software application that the system 100 provides content that is determined by the system 100 based on the first and/or second attributes. For example, after the second user 110 inputs the first and/or second attributes via the search element 200, the software application may provide the first and/or second attributes to the natural language engine 210 of the system for processing. The natural language engine 210 may determine additional content and terms related to the first and/or second attributes that the second user 110 may desire to include in a search to determine potential team combinations of participants to participate in a project controlled by the second user 110. The natural language engine 210 may generate an attribute map that maps and relates the first and/or second attributes to the additional content and terms determined by the natural language engine 210. The determined additional content and terms may be pushed to the search element 200 and displayed via a graphical user interface of the software application to the second user 110. The second user 110 and/or second user device 111 may select all or a subset of the additional content and terms provided to the search element 200. Whichever content and terms are selected via the search element 200 may be provided by the software application to a search engine 220 to execute a search to determine potential combination of participants based on the selected content and terms. In certain embodiments, the search element 200 may take the form of a digital search form, a search box, a input mechanism, a speech-to-text input mechanism, a VoIP call input mechanism, a video input mechanism, any other type of input mechanism, or any combination thereof.

The system 100 may include a natural language engine 210, which may be comprised of hardware, software, or a combination thereof. The natural language engine 210 may include a series of modules and/or components including, but not limited to, a natural language controller 212, one or more semantic query libraries 214, a graph database 216, and a natural language machine learning module 218. Notably, the natural language engine 210 may include and incorporate the functionality of any existing natural language processing system. In certain embodiments, the natural language engine 210 may be configured to incorporate functionality to comprehend human language and/or speech, whether it be spoken, written, symbolized, or a combination thereof. The natural language engine 210 may be configured to determine terms and content related to the first attributes and/or second attributes input into the search element 200, such as by determining associations and similarities between the terms and content to the first and/or second attributes, by recognizing patterns in the attributes that correspond to the terms and content, by determining synonyms for the first and second attributes, by performing any other natural language processing capabilities, or any combination thereof.

The natural language controller 212 of the natural language engine 210 may serve as the "brains" of the natural language engine 210 that controls the functions and operations of the natural language engine 210. In particular, the natural language controller 212 may be configured to receive the first and/or second attributes inputted by the second user 110 and/or second user device 111 into the search element 200 of the software application. The natural language controller 212 may be configured to pass the inputted attributes through a series of semantic query libraries 214 so as to determine an initial set of potential content and terms related to the inputted attributes. Additionally, the natural language controller 212 may utilize any number and/or any type of natural language processing algorithms to facilitate in this process. In certain embodiments, the content and terms may be related to the inputted attributes based on the content and terms having words, letters, or sounds in common with the first and/or second attributes, based on the content and terms being in a same subject matter area of the first and/or second attributes, based on the content and terms being typically used in conjunction with the terms used in the first and/or second attributes, based on the content and terms being used in other projects associated with the first and/or second attributes, based on the content and terms having any relation to the first and/or second attributes, or any combination thereof. The semantic query libraries 214 may incorporate any functionality and features of existing semantic query libraries. Additionally, the semantic query libraries 214 may be configured to include repositories of information and data, along with relationships and associations between words, content, and their meanings, to enable the natural language controller 212 to determine content and terms relevant and/or related to the first and second attributes. The semantic query libraries 214 may enable the natural language controller 212 to determine the relevant content and terms based on the intent and contextual meaning of the terms contained within the first and second attributes. In certain embodiments, the data and information contained in the semantic query libraries 214 may be structured and formatted so as to enable the natural language controller 212 to consider the context of the first and/or second attributes including, but not limited to, a location associated with the first and/or second attributes, an intent associated with the first and/or second attributes, variations in the first and/or second attributes, concepts associated with the first and/or second attributes, any other contexts, or any combination thereof.

Once the initial set of terms and/or content are determined by the natural language controller 212 based on the passing of the first and/or second attributes through the semantic query libraries 214, the natural language controller 212 may then compare the initial set of terms and/or content to the graph database 216 to determine if additional terms and/or content are missing or if more optimal terms and/or content related to the first and/or second attributes exist. The graph database 216 may incorporate any the features and functionality of a traditional graph database. In certain embodiments, the graph database 216 may utilize graph structures to represent and store data. Notably, the graph database 216 may store relationships between the data and content stored within the graph database 216, and may store any type of data, content, and/or terms that may be utilized to assist in determining the content related to the first and/or second attributes. Data and content that is related to one another within the graph database 216 may be readily retrieved by the graph database 216 and/or system 100 based on their association. The graph database 216 may include additional content and terms related to or associated with the first and/or second attributes that may not be contained in the semantic query libraries 216. As a result, the graph database 216 may serve as a backup resource for the natural language controller 212 to determine additional content and terms associated with the first and/or second attributes that may be sent back to those that control the project. If additional terms and/or content related to the first and/or second attributes are determined by the natural language controller 212, these additional terms and/or content, along with the initial terms and/or content determined based on the semantic query library comparison, may be transmitted to the second user device 111 for review by the second user 110 and/or by the second user device 111 itself.

Once the terms and/or content are provided to the second user 110 and/or to the second user device 111, such as via a list of recommended terms and/or content, all or a subset of the terms and/or content may be selected for a search to be conducted by the search engine 220 of the system 100. As the second user device 111 and/or the second user 110 selects the terms and/or content to be searched, the natural language machine learning module 218 of the natural language engine 210 may record the selections of the terms and/or content from the list and assist the natural language controller 212 to determine future recommended lists of content and/or terms for future projects and/or future attributes inputted into the system 100. In this way, the system 100 learns over time which content and words have a higher priority than other content and terms, and can recommend certain higher priority terms and content to be searched over the other terms and content which are not typically selected or are not related to the attributes inputted into the system 100.

After receiving the selection of the terms and/or content from the second user device 111 and/or the second user 110, the selected terms and/or content, along with the first and/or second attributes, may be passed to the search engine 220 of the system 100 to execute a search using the selected terms, content, first attributes, and/or second attributes. The search engine 220 of the system 100 may be configured to determine and predict which potential team combinations of participants fit the search query including the selected terms and/or content, first attributes, and/or second attributes. In certain embodiments, the search engine 220 may include a series of modules and components including, but not limited to, one or more search algorithms 222, the database 224, the database 226, a project feedback loop 228, and a search engine machine learning module 230. Once the query including the selected terms, content and attributes is provided to the search engine 220, the selected terms, content, and attributes may be inputted into one or more search algorithms 222 to execute the search so as to obtain a search result corresponding to the query. Notably, the one or more search algorithms 222 may comprise any type of available search algorithm, which may be utilized to execute the search. The search result that is generated based on execution of the search may comprise potential combinations of participants to participate in the project and/or tasks within the project that have a correlation with the selected portion of the terms and content, the first attributes, and/or the second attributes.

In order to obtain the potential combinations of participants, the search algorithms 222 of the search engine 220 may interface with and query database 224 (e.g. a marketplace database), the database 226 under the control of the second user 110, the second user device 111, or an entity associated with the second user 110 (e.g. a company), and a search engine machine learning module 230. The search algorithm 222 may query the database 226, which may include profiles for some or all of the individuals, devices, robots, or other possible participants associated with an entity (e.g. a company) associated with the second user 110 and/or the second user device 111. Each of the profiles may be examined using the search algorithms 222 to determine which individuals, devices, robots, or other possible participants would be suitable participants for the project based the information stored in each corresponding profile. The individuals, devices, robots, or other possible participants may be suitable for the project if their profiles have a correlation, such as a threshold correlation, with the selected portion of content, terms, the first attributes, and/or the second attributes. Much like database 226, the database 224 may also be utilized in the search and may be queried using the search algorithm 222. The database 224 may include profiles for some or all individuals, devices, robots, or other possible participants that have already been vetted by the system 100, such as during previous searches, by an administrator of the system 100, by the second user 110, by a device in the system 100, or a combination thereof.

After executing the search on database 224 and/or database 226, the search engine 220 may generate a list including the potential combinations of participants according to the rank of each potential combination in the list. Each potential combination in the list may be ranked based on each potential combination's fit score, which is generated by the system 100 based on how well the potential combination would perform the project and/or tasks within the project. For example, the fit score for each combination of participants may be generated based on a quantity of attributes the potential combination itself has in common with the first attributes, the second attributes, and/or the selected portion of content and terms. In certain embodiments, the greater the quantity of attributes in common with the search query attributes, terms and content, the higher the fit score for the potential combination. The fit score may also be generated based on how efficiently the potential combination may be predicted by the system 100 to complete the project (a higher efficiency would have a higher score); based on how effectively the participants in the potential combination may be predicted to work together to complete the project based on personalities, skill sets, education levels, health, location, and/or other factors; based on a predicted probability of the potential combination completing the project during a completion date range specified for the project and/or tasks within the project; based on the potential combination having a threshold degree of correlation with the first attributes, the second attributes, and/or the selected portion of the content; and/or based on any other desired parameters. In certain embodiments, the fit score may be a numerical value from 0-100 or any other desired numerical range, or a may be represented in graph or visual form. In other embodiments, the fit score may correspond with descriptive keywords that describe the strength of the correlation between a particular combination of participants and the combination's predicted performance level for the project. For example, the fit scores may range from "low probability of success," "below average probability of success," "moderate probability of success," high probability of success," and "optimal probability of success." The system 100, through the search engine 220, may also include generating and providing a confidence score for each individual, device, robot, program, or a combination thereof, within each combination of the potential combinations based on a degree of correlation of each individual, device, robot, program, or a combination thereof, with the first attributes, the second attributes, the selected portion of the content, or a combination thereof. The confidence score may indicate the degree to which each participant within the potential combination to which they belong has attributes or characteristics in common with the first attributes, the second attributes, and/or the selected portion of the content and/or terms.

Once the list of potential combinations is generated, the search engine 220 may provide the list to the second user device 111 and/or other device or individual for review and/or analysis. One or more potential combinations, for example, may be selected by the second user device 111 to participate in the project. When a particular combination of participants is selected, a signal may be transmitted from the second user device 111 to a device associated with the potential combination. For example, if first user 101 and/or first user device 102 are in a combination that is selected by the second user device 111, a signal may be transmitted to the first user device 102 providing a notification of the selection. The first user device 102 and/or the first user 101 can accept the selection and begin performing the project. While the project is being performed and/or after the project is completed, each of the participants in the project may submit feedback to the system 100, which may be a part of a feedback loop 228 between the database 226, the search engine machine learning module 230, and/or any other component of the system 100. The feedback may be feedback on the project itself, feedback on tasks within the project, feedback on the other participants in the project, feedback on those controlling the project, feedback on successes within the project, feedback on failures within the project, feedback on their own satisfaction with the project, any other type of feedback, or a combination thereof. Notably, feedback received for a first participant from a second participant may be utilized to update the information and attributes stored for the first participant in the first participant's profile.

The search engine machine learning module 230 may monitor which combination of participants is selected by those in control of the project, and may also monitor the feedback provided by each participant in the selected combination that is involved in completing the project. Based on the combination selections and the feedback received into the system 100, the search engine machine learning module 230 may adjust algorithm variable weights used in the search algorithms 222, along with search algorithm parameters, so as to optimize the relevance of future searches for future projects. For example, based on the feedback, the search engine machine learning module 230 may determine that a certain variable associated with an attribute should be weighted higher than another variable for another attribute for a specific type of project. As a result, over time, the system 100 will continuously optimize the potential combinations of participants determined based on the type of project and its requirements through the use of machine learning.

Operatively, the system 100 may function as shown in the following exemplary use-case scenario. Of course, any other type of use-case scenario may be utilized and the following use-case scenario is not intended to limit the scenarios in which the system 100 may operate. In this example use-case scenario, second user 110 may be an individual that controls a particular project for a company X. The project may be a computer programming project to develop a software program that automatically generates presentations. The second user 110 may specify various attributes associated with the project including, but not limited to, the duration of the project, how many participants are needed for the project, a list of the functions that the software program will need to provide its users, any other project descriptors, or any combination thereof. In this case, the second user 110 may specify, via the graphical user interface search element 200 (e.g. an input search form) displayed on the second user device 111, that the duration of the project is one year, that three participants are needed, and that the software program will need software functions created that allow users of the software program to specify the subject matter of a presentation, the type of content to go into the presentation, the style of the presentation, and other presentation parameters in order to facilitate the generation of the presentations by the software program to be developed.

The second user 110 may also specify various desired attributes for participants to participate in the project. In this case, the second user 110 may specify that a human or device participant needs to be available for a year, that a human participant needs a computer science degree, that a human or device participant must work on the project for at least ten hours per day, that a human or device participant must have previously developed a software program in the past, that the human or device participant is located within a certain range of an entity associated with the second user 110, any other desired attribute, or a combination thereof. The project attributes and the participant attributes may be provided to the system 100 via the input into the search element 200. The inputted project and participant attributes may be passed to the natural language engine 210, which may run the attributes through a semantic query library 214, natural language processing algorithms, and/or a graph database 216 to determine content related to the attributes. For example, in this case, the natural language engine 210 may determine, based on the comparison with the semantic query library 214 and graph database 215, that for the inputted attribute of "computer science degree," the terms "software engineering degree," "coding," "software development," and "software programming" are related to the inputted attribute "computer science degree." The related terms and content determined by the system 100 may depend on the context of the desired role for the participant in the project. Additionally, the related terms and content may be determined based on historical data of how word and/or content associations have been chosen in the past. Once the related terms and content are determined, they are passed back to the search element 200 for the second user 110 to select all or a subset of the related terms and content to be searched by the system 100.

Once the second user 110 has selected all or a subset of the related terms and content, the system 100 may pass the input data to the search engine 220 and a search may be executed based on the selected terms and content, the project attributes, and/or the participant attributes. The search engine 220 analyzes the input requirements against the user and device profiles contained in company X's database (e.g. database 226), the system's 100 database (e.g. database 224), and/or other repositories to determine a list of potential combinations of participants who meet the qualifications and have availability to work on the project. In this case, the system 100 may determine two potential combinations of participants that may be suitable for the project: Potential Combination 1 may include one robot participant, one human participant, and one device participant; and Potential Combination 2 may include one human participant, and two device participants. The system 100 may determine how well each of the two potential combinations of participants would perform the project, and may generate a fit score for each team respectively. Potential Combination 1 may have a fit score of 93 out of 100 and Potential Combination 2 may have a fit score of 88 out of 100. Each participant within each combination may have a confidence score (e.g. 0-100 scale) based on how well the participant fits with the attributes, terms, and/or content in the search. Additionally, the system 100 may provide a list of other participants that are not in Potential Combination 1 or 2, but nonetheless, may be of interest to the second user 110 when selecting a combination of participants to perform the project. Potential Combination 1 and 2 may be transmitted, along with the list of other candidates, to the second user 110 by transmitting them to second user device 111.

The second user 110 may either select Potential Combination 1 or 2, or the second user 110 may swap out candidates from the list of other candidates into either Potential Combination 1 or 2, thereby creating a new combination of participants. If the second user 110 customizes his or her own combination by swapping out candidates, the fit score for the new combination may be updated in real-time as candidates are swapped in and out of the combination. In this case, the second user 110 may select Potential Combination 1 because of the fit score of 93, and the second user device 111 may transmit a signal to the robot participant, the human participant (e.g. first user 101), and the device participant (e.g. first user device 102) advising of the selection. At this point, each participant in Potential Combination 1 may accept or decline participation in the project. If a participant declines, the system 100 may select another participant to replace the participant that declined. In this case, each of the participants in Potential Combination 1 may opt to participate in the project. While the project is being completed and/or after completion of the project by Potential Combination 1, each of the participants may give feedback on the other participants in Potential Combination 1, the second user 110, and the project itself. Additionally, the second user 110 and/or the second user device 111 may also give feedback on the participants as well. The feedback may then be utilized by the search engine machine learning module 230 to adjust search algorithm weights and other parameters to optimize the relevance of future searches for future projects, such as projects that may be related to the software program that automatically generates presentations that was developed by Potential Combination 1.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving attributes for a project and attributes for participants in a project; providing the attributes to a controller 212 of a natural language engine 210; providing the attributes to a semantic query library 214, natural language machine learning module 218, and/or graph database 216 to determine content and terms related to the attributes; receiving the content and terms; providing the content and terms to a search element; receiving a selection of a portion of the content and terms, executing a search based on the selection of the portion of the content, terms, and the attributes; determining potential combinations of participants to participate in the project; providing the potential combinations in a list according to a fit score; transmitting signals to devices advising of selected combinations of participants; receiving feedback relating to completion of the project; utilizing the feedback to adjust algorithm weights and parameters to optimize the relevance of combinations generated in response to a future search for a future project; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-4 illustrates specific example configurations of the various components of the system 100, the system 100 may include any configuration of the components, which may include using a greater or lesser number of the components. For example, the system 100 is illustratively shown as including a first user device 102, a second user device 111, a database 125, a communications network 135, a server 140, a server 150, a server 160, and a database 155. However, the system 100 may include multiple first user devices 102, multiple second user devices 111, multiple databases 125, multiple communications networks 135, multiple servers 140, multiple servers 150, multiple servers 160, multiple databases 155, or any number of any of the other components inside or outside the system 100. Similarly, the system 100 may include any number of search elements 200, natural language engines 210, natural language controllers 212, graph databases 216, natural language machine learning modules 218, search engines 220, search algorithms 222, databases 224, databases 226, search engine machine learning modules 230, and project feedback loops 228. Furthermore, in certain embodiments, substantial portions of the functionality and operations of the system 100 may be performed by other networks and systems that may be connected to system 100.

Figure 5:
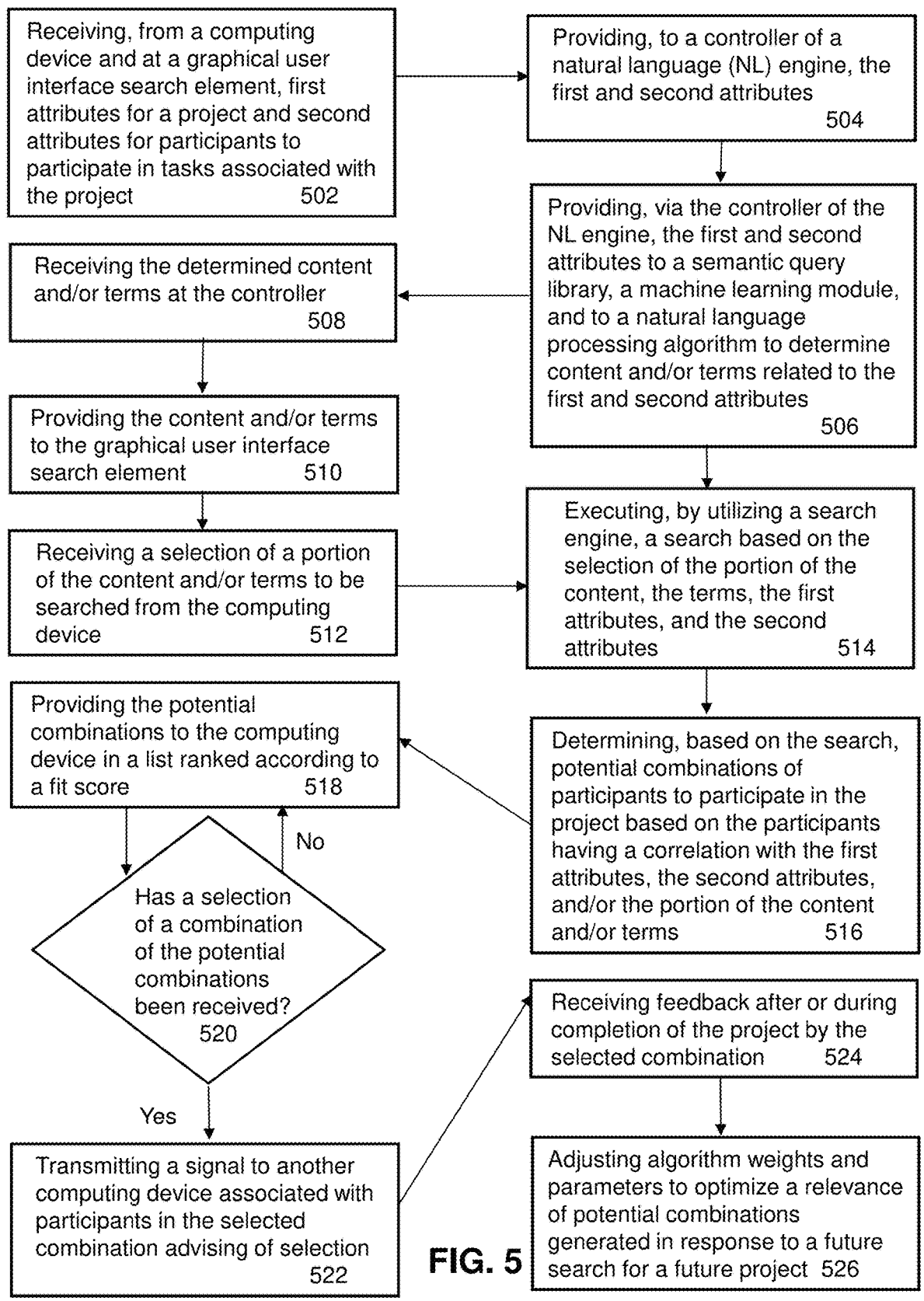
FIG. 5 is a flow diagram illustrating a sample method for optimizing project and/or task completion through the use of machine learning according to an embodiment of the present disclosure.

As shown in FIG. 5, an exemplary method 500 for optimizing project and/or task completion through the use of machine learning is schematically illustrated. The method 500 may include, at step 502, receiving first attributes for a project and second attributes for participants to participate in tasks associated with the project. In certain embodiments, the receiving may be performed and/or facilitated by utilizing the first user device 102, the second user device 111, the server 140, the server 150, the server 160, the communications network 135, any combination thereof, or by utilizing any other appropriate program, network, system, or device. For example, the attributes may be received at a natural language engine 210 from a second user device 111 via a graphical user interface search element of an application executing on the second user device 111. The second user device 111 may, for example, be controlled by an individual that created the project. The first attributes for the project may include, but are not limited to, information describing requirements for the project, information describing objectives for the project, information describing tasks to be completed within the project, information describing the type of project, information describing a desired end result of the project, any attribute associated with the project, or any combination thereof. The second attributes for human participants to participate in the tasks associated with the project may include, but are not limited to, information describing skill sets desired for individuals to participate in the project, information describing demographic information required for individuals to participate in the project (e.g. age, location, education level, gender, ethnicity, race, health status, etc.), language skills desired for individuals to participate in the project, certifications required for an individual to participate in the project, incentives and/or compensation to be provided to an individual for participating in the project, required availability and duration for a participant to participate in the project, any other attributes, or any combination thereof. The second attributes for device and/or software program participants may include, but are not limited to, memory requirements for participating in the project, processing power requirements for participating in the project, power levels (e.g. battery levels, charge levels, etc.) for participating in the project, an ability to execute selected algorithms for accomplishing tasks of the project, sensor requirements for participating in the project, telecommunication capabilities necessary for participating in the project, any device specifications for a device to participate in the project, functional requirements necessary for participating in the project, any other attribute, or any combination thereof. In certain embodiments, the first attributes for the project and/or the second attributes for the participants to participate in the project may be represented by keywords, identifiers, tags, words, images, video content, media content, audio content, or any combination thereof. In certain embodiments, the first and second attributes may be stored in user profiles and device profiles respectively.

At step 504, the method 500 may include providing the first and second attributes to a natural language controller 212 of the natural language engine 210 of the system 100. In certain embodiments, the providing may be performed and/or facilitated by utilizing any component of the natural language engine 210, the server 140, the server 150, the server 160, the communications network 135, any combination thereof, or by utilizing any other appropriate program, network, system, or device. At step 506, the method may 500 include providing, via the natural language controller 212, the first and second attributes to one or more semantic query libraries 214, to a natural language machine learning module 218, and/or to a graph database 216. Additionally, the first and second attributes may be fed to one or more natural language processing algorithms for processing. In certain embodiments, the providing may be performed and/or facilitated by utilizing any component of the natural language engine 210, the server 140, the server 150, the server 160, the communications network 135, any combination thereof, or by utilizing any other appropriate program, network, system, or device. Notably, the attributes may be provided to the semantic query libraries 214, the natural language machine learning module 218, the graph database 216, and/or to the natural language processing algorithms so as to determine content and/or terms related to the first and second attributes, which may then be utilized to optimize a search for participants for the project. The content, for example, may include, but is not limited to, keywords, identifiers, image content, video content, tags, data, text, any other type of content, attributes related to the first and second attributes, or any combination thereof, which is related to the first and/or second attributes received by the system 100.

At step 508, the method 500 may include receiving the determined content and/or terms at the natural language controller 212 of the natural language engine 210. In certain embodiments, the receiving may be performed and/or facilitated by utilizing any component of the natural language engine 210, the server 140, the server 150, the server 160, the communications network 135, any combination thereof, or by utilizing any other appropriate program, network, system, or device. Once the content and/or terms are received at the natural language controller 212, the natural language controller 212 may select and provide, at step 510, all or a subset of the determined content and/or terms to the graphical user interface search element of the application executing on the second user device 111. In certain embodiments, the selecting and providing may be performed by utilizing any component of the natural language engine 210, the server 140, the server 150, the server 160, the communications network 135, any combination thereof, or by utilizing any other appropriate program, network, system, or device. At step 512, the method 500 may include receiving, from the second computing device 111, a selection of a portion of the content to be searched via a search engine 220 of the system 100. In certain embodiments, the receiving of the selection of the portion of the content may be performed and/or facilitated by utilizing any component of the natural language engine 210, the server 140, the server 150, the server 160, the communications network 135, any combination thereof, or by utilizing any other appropriate program, network, system, or device. The selection may comprise keywords, text, images, video content, any type of content, identifiers, or any combination thereof, and may be received at or forwarded to the search engine 220 of the system 100 in the form of a query. In certain embodiments, the selection may be received via an application executing on the second computing device 111 of the second user 110. For example, the selection may be received via a graphical user interface search element of the application, audio submitted to a speech-to-text function of the application, a digital call made via the application, any other input mechanism, or any combination thereof.

At step 514, the method 500 may include executing, by utilizing the search engine 220, a search based on the selection of the portion of the content, the first attributes associated with the project, and/or the second attributes associated with the participants. In certain embodiments, the executing may be performed by utilizing any component of the search engine 220, the server 140, the server 150, the server 160, the communications network 135, any combination thereof, or by utilizing any other appropriate program, network, system, or device. In executing the search, the search engine 220 may provide a search query including the selected portion of the content, the first attributes, and/or the second attributes as input to one or more search algorithms 222 so as to determine, at step 516, a search result corresponding to the search query. In certain embodiments, the determining may be performed by utilizing any component of the search engine 220, the server 140, the server 150, the server 160, the communications network 135, any combination thereof, or by utilizing any other appropriate program, network, system, or device. The search result may comprise potential combinations of participants to participate in the project and/or tasks within the project that have a correlation with the selected portion of the content, the terms, the first attributes, and/or the second attributes. In order to obtain the potential combinations of participants, the search algorithms 222 of the search engine 220 may interface with and query a database 224 controlled by the system 100 (e.g. marketplace database), a database 226 under the control of the second user 110, the second user device 111, or an entity associated with the second user 110 (e.g. a company), and a search engine machine learning module 230. As an example, the search algorithm 222 may query the database 226, which may house profiles for all of the employees of a company that the second user 110 works for. The profiles may be examined using the search algorithm 222 to determine which employees would be suitable participants for the project based the information in each employee's user profile having a correlation with the selected portion of content, the first attributes, and/or the second attributes. Similarly, the database 224 may also be factored into the search and may be queried using the search algorithm 222. The database 224 may include profiles for all individuals vetted by the system 100, any programs vetted by the system 100, any robots vetted by the system, all devices vetted by the system 100, any participant vetted by the system, any participant, or any combination thereof.

At step 518, the method 500 may include generating a list including the potential combinations of participants according to the rank of each potential combination determined by the system 100, and providing the list to the second user device 111 for review and/or analysis. In certain embodiments, the generating may be performed by utilizing any component of the search engine 220, the server 140, the server 150, the server 160, the communications network 135, any combination thereof, or by utilizing any other appropriate program, network, system, or device. Each potential combination may be ranked based on each potential combination's fit score, which is generated by the system 100 based on how well the potential combination would perform the project and/or tasks within the project. For example, the fit score for each combination of participants may be generated based on a quantity of attributes the potential combination itself has in common with the first attributes, the second attributes, and/or the selected portion of content. In certain embodiments, the greater the quantity in common the higher the fit score for the potential combination. The fit score may also be generated based on how efficiently the potential combination may be predicted by the system 100 to complete the project (a higher efficiency would have a higher score); based on how effectively the participants in the potential combination may be predicted to work together to complete the project based on personalities, skill sets, education levels, health, location, and other factors; based on a predicted probability of the potential combination completing the project during a completion date range specified for the project and/or tasks within the project; based the potential combination having a degree of correlation with the first attributes, the second attributes, and/or the selected portion of the content; and/or based on any other desired parameters. The system 100 may also include generating and providing a confidence score for each individual, device, or a combination thereof, within each combination of the potential combinations based on a degree of correlation of each individual, device, or a combination thereof, with the first attributes, the second attributes, the selected portion of the content and/or terms, or a combination thereof. The confidence score may indicate the degree to which each participant within the potential combination to which they belong has attributes or characteristics in common with the first attributes, the second attributes, and/or the selected portion of the content and/or terms.

At step 520, the method 500 may include determining if a selection of at least one of the potential combinations from the list of potential combinations has been made by the second user device 111 and/or the second user 110. In certain embodiments, the selection and/or the determining may be performed by utilizing the second user device 111, the server 140, the server 150, the server 160, the communications network 135, any combination thereof, or by utilizing any other appropriate program, network, system, or device. If a selection of at least one of the potential combinations has not been received, the method 500 may revert back to step 518 until a selection is received. If, however, a selection of at least one of the potential combinations is received, the method 500 may proceed to step 522, which may include transmitting a signal to a device associated with the potential combination of participants selected to provide a notification of the selection. For example, the system 100 may transmit a signal to first user device 102, which may belong to first user 101. Both the first user device 102 and/or the first user 101 may have been members of the selected combination of participants. In certain embodiments, the transmitting of the signal may be performed by utilizing the server 140, the server 150, the server 160, the communications network 135, any combination thereof, or by utilizing any other appropriate program, network, system, or device. At this point, the selected participants in the combination may begin performing the project and/or tasks within the project.

As the project is being performed, after completion of the project, and/or as tasks are being completed or are actually completed for the project, the method 500 may include, at step 524, receiving feedback from participants in the selected combination and/or from the second user 110 and/or second user device 111 controlling the project. In certain embodiments, the feedback may be generated and/or received by utilizing the first user device 102, the second user device 111, the server 140, the server 150, the server 160, the communications network 135, any combination thereof, or by utilizing any other appropriate program, network, system, or device. The feedback may include, but is not limited to, feedback corresponding to each participant's rating of other participants in the combination as it pertains to each participant's performance during completion of the project, feedback corresponding to the second user's 110 rating of each participant in the combination as it pertains to each participant's performing during completion of the project, feedback corresponding to whether the combination was effective at completing the project, feedback indicating whether the fit score for the selected combination correlated with the combination's performance during completion of the project, feedback indicating whether the confidence score for each individual participant correlated with each participant's performance during completion of the project, any other type of feedback, or any combination thereof. In certain embodiments, the feedback received for each combination and each participant may be incorporated into each participant's user profile and/or device profile so as to update the user profile and/or device profile respectively for future determinations performed by the system 100.

At step 526, the method 500 may include adjusting algorithm weights (e.g. variable weights) and parameters to optimize a relevance of potential combinations generated in response to a future search conducted using the system 100 for a future project. In certain embodiments, the adjusting may be performed by utilizing the server 140, the server 150, the server 160, the communications network 135, any combination thereof, or by utilizing any other appropriate program, network, system, or device. As an example, initially the system 100 may have weighted a first attribute higher than a second attribute based on the initial information accessible to the system 100. However, after receiving feedback and/or based on the actual combination of participants selected to perform the project, the system 100 may determine that the second attribute should actually have a higher weight than the first attribute, and may adjust the weights accordingly so that future searches for potential combinations for future projects may be adjusted appropriately so as to optimize the potential combinations generated for the future projects. In certain embodiments, the search engine machine learning module 230 may monitor each selected combination of participants to complete the project and the feedback provided. In certain embodiments, the search engine machine learning module 230 may performing the adjusting of the algorithm weights and other parameters to optimize the relevance of future searches for future projects or even a project similar or identical to the completed project. Notably, the method 500 may further incorporate any of the features and functionality described for the system 100 or as otherwise described herein.

The systems and methods disclosed herein may include additional functionality and features. For example, when the first and second attributes are passed to the natural language engine 210 of the system 100, the first and second attributes may be initially compared against the semantic query libraries 214 to generate a first pass of content associated with the first and second attributes. Such content may, for example, include initial keywords, terms, and/or other content related to the first and/or second attributes. The content generated in the first pass may be passed back to the natural language controller 212, which may then check and compare this content against the data and information contained in graph database 216 to determine if there is any missing or more optimal content that is not included in the content generated in the first pass with the semantic query libraries 212. If there is additional content found after the graph database 216 comparison, then the additional content may be combined with the related content generated from the first pass with the semantic query libraries 214. The combined content may be sent by the natural language controller 212 to the search element 200 so that the second user 110, the second computing device, or a combination thereof, may select all or a portion of the combined content to be searched via the search engine 220 to determine the potential combinations of participants for the project.

As another example, in certain embodiments, when the selected portion of content and/or the first and second attributes are passed to the system 100 (such as when the second computing device 111 selects a subset of the content from the list of content provided by the natural language engine 210), the natural language machine learning module 218 may update information and data in both the semantic query libraries 214 and the graph database 216 to include terms and content corresponding to the selected portion of the content. This updating may serve to increase the amount of indexed and searchable content in the semantic query libraries 214 and the graph database 216 so that for each subsequent search conducted in the system 100, the quality of the search results including the potential combinations of participants is improved over time. Additionally, as additional selected portions of content are received by the system 100, certain terms and content may have higher priority when compared to other terms and content over time. The priority may be designated by the second user 110, the second computing device 111, and/or even the system 100 itself. The system 100 may designate a higher priority to terms and content that have a threshold association or a stronger association to the first and/or second attributes than other terms and content. Additionally, the system 100 may designate higher priority to terms and content based on the particular terms and content being explicitly selected by the second user 110, the second computing device 111, or a combination thereof. As the priority of terms and content changes over time, the generated potential combinations of participants may also change accordingly, thereby providing increasingly optimal combinations as the information in the system 100 changes with each selected portion of content and/or terms selected. In certain embodiments, once certain terms and/or content are selected via the search element 200 by the second user 110 and/or the second computing device 111, the natural language machine learning module 218 may record the selected terms and/or content. The natural language machine learning module 218 may then assist the natural language controller 212 determine, for future recommendations of terms and/or content, which terms and content have a higher priority than other terms and/or content to be recommended.

As yet another example, when the system 100 determines, via the search engine 220, the potential combinations of participants to be included in the ranked list of potential combinations to be sent to the person or device controlling the project, the system 100 may also determine other potential combinations of participants that may be suitable for the project, but are not to be included in the ranked list because these other combinations do not meet a threshold level of correlation with the selected content, the first attributes, and/or second attributes. These other potential combinations of participants may have fit scores calculated for them and the participants within the combinations may have confidence scores calculated for them. These other potential combinations may be placed in a separate list that may be made accessible to those that control the project. In certain embodiments, those that control the project may select one or more of the potential combinations in the separate list to participate in the project. In certain embodiments, those that control the project may select one or more participants from a potential combination in the separate list and substitute them for one or more participants from a potential combination in the ranked list. If such an action is conducted, a new combination of participants is created and the fit score for the new combination may be automatically and dynamically generated and displayed to those that control the project.

In certain embodiments, the system and methods may also include a master list including all possible participants. This master list may be transmitted to those that control the project and may be utilized by the second user 110, the second computing device 111, or a combination thereof, to create their own customized team combination for the project. In certain embodiments, those that control the project may deselect or remove a selected quantity of participants from a potential team combination in the ranked list and substitute them with any number of participants from the master list including all possible participants. This allows those that control the project to create custom team combinations, while also receiving input from the system 100. Whenever participants are substituted into a team combination, the system 100 may automatically and dynamically update the fit score for the new team combination that results from the substitution(s).

The systems and methods disclosed herein may include further functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and method 500. For example, through the use of the natural language machine learning module 218 and the search engine machine learning module 230, a reduced amount of computer operations need to be performed by the devices in the system 100 using the processors and memories of the system 100 than in systems that are not capable of machine learning as described in this disclosure. In such a context, less processing power needs to be utilized because the processors and memories do not need to perform analyses and operations that have already been learned by the system 100. As a result, there are substantial savings in the usage of computer resources by utilizing the software, functionality, and algorithms provided in the present disclosure.

Notably, in certain embodiments, various functions and features of the system 100 and methods may operate without human intervention and may be conducted entirely by computing devices, robots, and/or processes. For example, in certain embodiments, multiple computing devices may interact with devices of the system 100 to provide the functionality supported by the system 100. Additionally, in certain embodiments, the computing devices of the system 100 may operate continuously to reduce the possibility of errors being introduced into the system 100. In certain embodiments, the system 100 and methods may also provide effective computing resource management by utilizing the features and functions described in the present disclosure. For example, in certain embodiments, upon receiving inputs via the graphical user interface search element 200 (or upon the performance of any other operation as described for the system 100 or the method 500), any selected device in the system 100 may transmit a signal to a computing device receiving or processing the input that only a specific quantity of computer processor resources (e.g. processor clock cycles, processor speed, processor cache, etc.) may be dedicated to processing the input, any other operation conducted by the system 100, or any combination thereof. For example, the signal may indicate an amount of processor cycles of a processor that may be utilized to process the input, and/or specify a selected amount of processing power that may be dedicated to processing the input or any of the operations performed by the system 100. As another example, signals may be utilized to indicate an amount of processor cycles of a process that may be utilized to determine content and/or terms related to attributes associated with a project and/or participants, an amount of processor cycles that may be utilized to execute the search using the search engine 220, an amount of processor cycles that may be utilized to determine the potential combinations of participants to participate in the project, an amount of processor cycles that may be utilized to adjust algorithm weights and/or parameters to optimize the relevance of potential combinations generated in response to a future search for a future project or even a current project, an amount of processor cycles that may be utilized for any operation of the system 100, an amount of processor cycles that may be utilized by any device and/or software application of the system 100, or any combination thereof. In certain embodiments, a signal indicating the specific amount of computer processor resources or computer memory resources to be utilized for performing an operation of the system 100 may be transmitted from the first and/or second user devices 102, 111 to the various components and devices of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected, predetermined, and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. Notably, the signals transmitted to the processors and memories may be utilized to optimize the usage of computing resources while executing the operations conducted by the system 100. As a result, such features provide substantial operational efficiencies and improvements over existing technologies. In further embodiments, the system 100 may identify which portions of memory resources should be dedicated to which devices of the system 100, which modules of the system 100, which software applications of the system 100, any component of the system 100, or any combination thereof.

In certain embodiments, the system 100 and methods may perform more optimally and/or efficiently when certain functionality and/or operations for the system 100 are executed by utilizing a graphics processing unit. For example, operations and functionality performed by the natural language machine learning module 218 may be facilitated and/or directly performed by utilizing a graphics processing unit. Similarly, operations conducted by the semantic query libraries, the controller 212, the graph database 216, the search engine 110, the natural language engine 210, the search engine machine learning module 230, the marketplace database 224, the search algorithm 222, the database 226, any other component of the system 100, or any combination thereof, may be conducted all or in part by utilizing a graphics processing unit. In certain embodiments, users of the system 100 and/or devices of the system 100 may be provided with the option to select which operations and/or functionality are conducted using graphics processing units and which operations and/or functionality are conducted using central processing units and/or other types of computer processors.

In further embodiments, the system 100 and methods may include utilizing one or more models for facilitating the operative functionality provided by the natural language machine learning module 218 and/or the search engine machine learning module 230. The models utilized by the natural language machine learning module 218 and/or search engine machine learning module 230 may be trained as the system 100 operates over time and as data is generated and/or outputted by the system 100 over time. Based on the training, the natural language machine learning module 218 and/or search engine machine learning module 230 may regularly optimize the determination of potential combinations of participants to participate in projects over time. Additionally, as more feedback is received in the system 100, the system 100 may utilize the feedback to update, improve, and/or enhance the functional features and operations conducted by the natural language machine learning module 218 and/or search engine machine learning module 230, and may be utilized to train the models utilized by the modules 218, 230. In further embodiments, feedback and/or data generated by the system 100 may be utilized to adjust algorithm weights and/or parameters utilized by the components of the system, such as the natural language machine learning module 218 and/or search engine machine learning module 230 so the natural language machine learning module 218 and/or search engine machine learning module 230 operate in a more effective and accurate manner over time.

Figure 6:
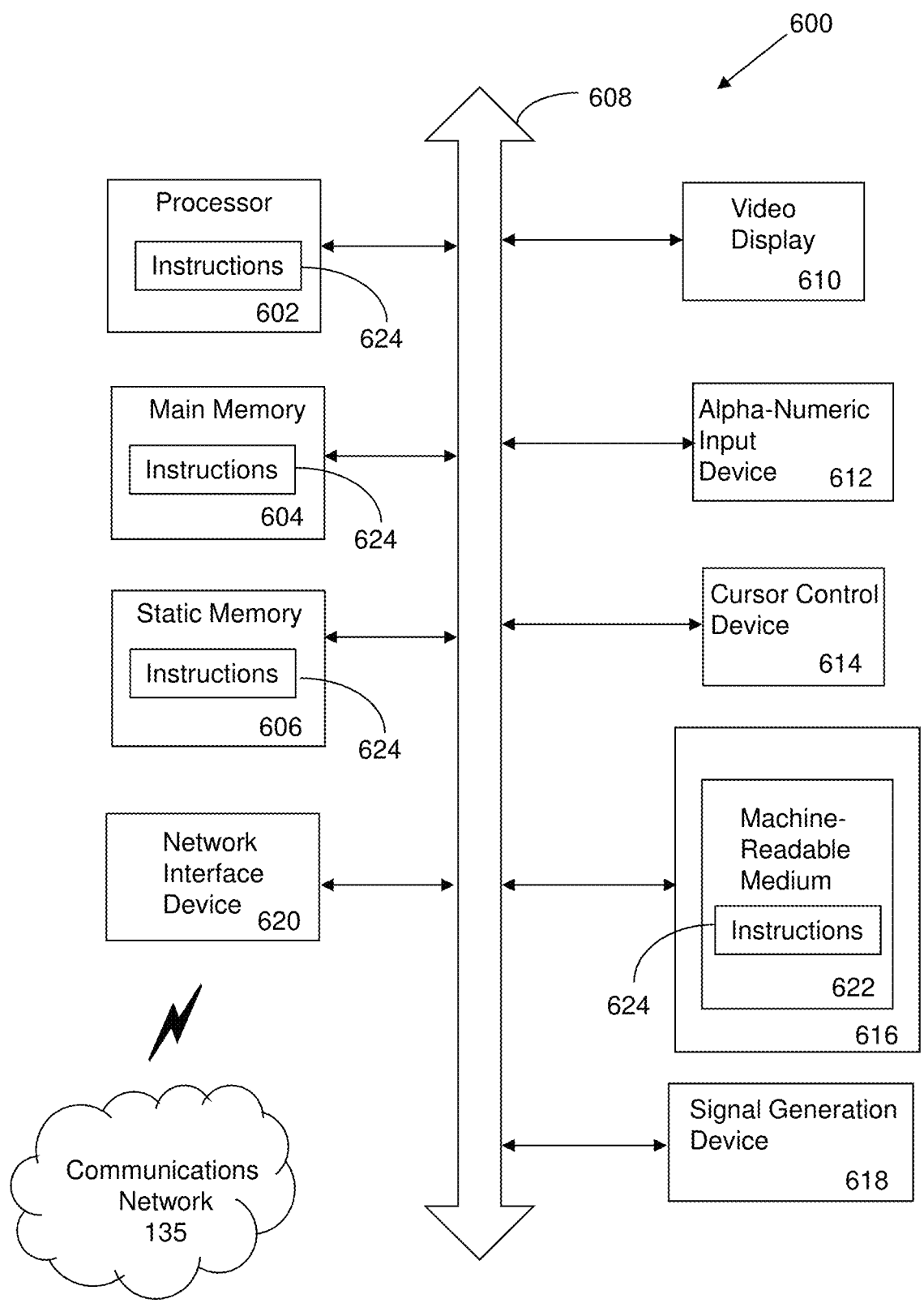
FIG. 6 is a schematic diagram of a machine in the form of a computer system within which a set of instructions, when executed, may cause the machine to perform any one or more of the methodologies or operations of the systems and methods for optimizing project and/or task completion through the use of machine learning.

Referring now also to FIG. 6, at least a portion of the methodologies and techniques described with respect to the exemplary embodiments of the system 100 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the database 125, the server 140, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, another network, or a combination thereof, can send or receive voice, video or data, and communicate over the communications network 135, another network, or a combination thereof, using the instructions. The instructions 624 may further be transmitted or received over the communications network 135, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions; and
   a processor that executes the instructions to perform operations, the operations comprising:
      receiving, from a first computing device and at a graphical user interface search element, first attributes associated with a project and second attributes for individuals, devices, or a combination thereof, to participate in tasks associated with completing the project;
      providing, to a controller of a natural language engine, the first attributes and the second attributes;
      providing, via the controller of the natural language engine, the first attributes and the second attributes to a semantic query library and to a natural language processing algorithm to determine content related to the first attributes and the second attributes;
      receiving the content at the controller;

providing the content to the graphical user interface search element;

receiving, via the graphical user interface search element, a selection of a portion of the content to be searched via a search engine, wherein the selection of the portion of the content to be searched via the search engine is utilized by the controller to determine and provide future recommended content for use in a future search for a future project, wherein the future recommended content has a higher priority than other recommended content for the future search for the future project based on the future recommended content being correlated with the selection of the portion of the content;

executing, by utilizing the search engine, a search based on the selection of the portion of the content, the first attributes, and the second attributes; and determining, based on the search, potential combinations of individuals, devices, or a combination thereof, for participating in the project, wherein the potential combinations are determined based on the individuals, the devices, or a combination thereof, in the potential combinations having a correlation with the first attributes, the second attributes, the portion of the content, or a combination thereof, wherein feedback associated with performance of a combination of the potential combinations during participation of the combination in the project is utilized to adjust a weight of an attribute for use in the future search for the future project.

2. The system of claim 1, wherein the operations further comprise generating a list including the potential combinations of individuals, devices, or a combination thereof, for participating in the project.

3. The system of claim 2, wherein the operations further comprise providing a fit score for each combination of the potential combinations based on a degree of correlation of each combination with the first attributes, the second attributes, the content, or a combination thereof.

4. The system of claim 3, wherein the operations further comprise providing a confidence score for each individual, device, or a combination thereof, in each combination of the potential combinations based on a degree of correlation of each individual, device, or a combination thereof, with the first attributes, the second attributes, the content, or a combination thereof.

5. The system of claim 1, wherein the operations further comprise comparing, at a graph database, the first attributes, the second attributes, and the content to determine additional content related to the first attributes and the second attributes.

6. The system of claim 1, wherein the operations further comprise recording, at a natural language machine learning module, the portion of the content, the first attributes, and the second attributes corresponding to the selection, and wherein the natural language machine learning module updates information in a graph database based on the recording.

7. The system of claim 6, wherein the operations further comprise assisting, by utilizing the natural language machine learning module and the recording, the controller to determine future recommendations for future potential combinations of individuals, devices, or a combination thereof, to participate in future projects related to the project.

8. The system of claim 1, wherein the operations further comprise receiving a selection of a combination of the potential combinations to participate in the project.

9. The system of claim 1, wherein the operations further comprise analyzing the feedback received after or during completion of the project.

10. The system of claim 9, wherein the operations further comprise adjusting, based on the feedback and by utilizing a search engine machine learning module, algorithm weights and other parameters to optimize a relevance of potential combinations generated in response to the future search for the future project.

11. The system of claim 1, wherein the operations further comprise querying a database of an organization associated with the project while executing the search, and wherein the operations further comprise querying a database of the system while executing the search, and wherein the database of the organization and the database of the system include profiles for individuals, devices, or a combination thereof, that are analyzed during the search.

12. The system of claim 11, wherein the operations further comprise incorporating the feedback received during or after completion of the project into the profiles.

13. The system of claim 1, wherein the operations further comprise enabling real-time modification of the potential combinations of individuals, devices, or a combination thereof, for participating in the project.

14. A method, comprising:
receiving, from a first computing device and at a graphical user interface search element, first attributes associated with a project and second attributes for individuals, devices, or a combination thereof, to participate in tasks associated with completing the project;

providing, to a controller of a natural language engine, the first attributes and the second attributes;

providing, via the controller of the natural language engine, the first attributes and the second attributes to a semantic query library and to a natural language processing algorithm to determine content related to the first attributes and the second attributes;

receiving the content at the controller;

providing the content to the graphical user interface search element;

receiving, via the graphical user interface search element, a selection of a portion of the content to be searched via a search engine;

executing, by utilizing the search engine, a search based on the selection of the portion of the content, the first attributes, and the second attributes; and determining, based on the search, potential combinations of individuals, devices, or a combination thereof, for participating in the project, wherein the potential combinations are determined based on the individuals, the devices, or a combination thereof, in the potential combinations having a correlation with the first attributes, the second attributes, the portion of the content, or a combination thereof, wherein the determining is performed by utilizing instructions from a memory that are executed by a processor, wherein feedback associated with performance of a combination of the potential combinations during participation of the combination in the project is utilized to adjust a weight of an attribute for use in a future search for a future project.

15. The method of claim 14, further comprising providing, to the first computing device, profiles corresponding to the individuals, devices, or a combination thereof, with the potential combinations.

16. The method of claim 14, further comprising adjusting a fit score for a selected combination of the potential combinations if an individual, device, or a combination thereof, is substituted for a different individual, device, or a combination thereof.

17. The method of claim 14, further comprising determining additional individuals, devices, or a combination thereof, not to be included in the potential combinations, but have a threshold level of correlation with the first attributes, the second attributes, the content, or a combination thereof.

18. The method of claim 17, further comprising enabling the additional individuals, devices, or a combination thereof, to be substituted into the potential combinations based on receiving a signal from the first computing device.

19. The method of claim 14, further comprising receiving a selection of a combination of the potential combinations to participate in the project, and further comprising transmitting a signal to a second computing device indicating the selection, wherein the second computing device is associated with an individual, a device, or a combination thereof, in the selection.

20. A non-transitory computer-readable device comprising instructions, which when loaded and executed by a processor, cause the processor to perform operations comprising:

receiving, from a first computing device and at a graphical user interface search element, first attributes associated with a project and second attributes for individuals, devices, or a combination thereof, to participate in tasks associated with completing the project;

providing, to a controller of a natural language engine, the first attributes and the second attributes;

providing, via the controller of the natural language engine, the first attributes and the second attributes to a semantic query library and to a natural language processing algorithm to determine content related to the first attributes and the second attributes;

receiving the content at the controller;

providing the content to the graphical user interface search element;

receiving, via the graphical user interface search element, a selection of a portion of the content to be searched via a search engine, wherein the selection of the portion of the content to be searched via the search engine is utilized by the controller to determine and provide future recommended content for use in a future search for a future project, wherein the future recommended content has a higher priority than other recommended content for the future search for the future project based on the future recommended content being correlated with the selection of the portion of the content;

executing, by utilizing the search engine, a search based on the selection of the portion of the content, the first attributes, and the second attributes; and determining, based on the search, potential combinations of individuals, devices, or a combination thereof, for participating in the project, wherein the potential combinations are determined based on the individuals, the devices, or a combination thereof, in the potential combinations having a correlation with the first attributes, the second attributes, the portion of the content, or a combination thereof.

* * * * *